United States Patent [19]
Kawase et al.

[11] Patent Number: 5,879,835
[45] Date of Patent: Mar. 9, 1999

[54] METHOD OF MANUFACTURING NICKELOUS POSITIVE-ELECTRODE ACTIVE MATERIAL FOR ALKALINE BATTERY

[75] Inventors: Hiroshi Kawase, Kariya; Yasuhito Kondo, Toyoake; Shinya Morishita; Shin-ichi Towata, both of Nagoya, all of Japan

[73] Assignee: Kabushiki Kaisha Toyoda Jidoshokki Seisakusho, Kariya, Japan

[21] Appl. No.: 803,416

[22] Filed: Feb. 20, 1997

[30] Foreign Application Priority Data

Feb. 23, 1996 [JP] Japan .................................. 8-062168

[51] Int. Cl.$^6$ .................................................. H01M 2/04
[52] U.S. Cl. ............................................................. 429/223
[58] Field of Search ............................ 429/223, 59, 218; 423/140, 592, 143, 142

[56] References Cited

U.S. PATENT DOCUMENTS 4,208,380  6/1980  Hamalainen et al. ................... 423/143
5,569,444  10/1996  Blanchard et al. ..................... 423/594

Primary Examiner—Maria Nuzzolillo
Assistant Examiner—Angela J. Martin
Attorney, Agent, or Firm—Morgan & Finnegan, L.L.P.

[57] ABSTRACT

A method of manufacturing a nickelous positive-electrode active material for an alkaline battery has a formation process in which nickel hydroxide and cobalt hydroxide are formed by adding an alkali metal hydroxide to a reaction system containing nickel ions and cobalt (II) ions. The method comprises at least one step of removing any oxidant which oxidizes the cobalt (II) ions into cobalt (III) ions, during or before the formation process. An expedient for the removal of the oxidant is, for example, to reduce and remove the oxidant by adding a reductant, such as L-ascorbic acid, to the reaction system. The reductant should preferably have an oxidation potential which is lower than the reduction potential of oxygen. Besides, the method should preferably comprise the step of removing the cobalt (III) ions, during or before the formation process.

18 Claims, No Drawings

METHOD OF MANUFACTURING NICKELOUS POSITIVE-ELECTRODE ACTIVE MATERIAL FOR ALKALINE BATTERY

BACKGROUND OF THE INVENTION

1. Field of the Invention

The present invention relates to a method of manufacturing a nickelous positive-electrode active material for alkaline batteries which are used for OA (office automation) equipment, cordless equipment, the power sources of electric vehicles, etc.

2. Description of the Related Art

An alkaline secondary battery is capable of boost charging and high-current discharging. In addition, the alkaline secondary battery is highly immune to overcharging and overdischarging. It has therefore been used for a cordless device, the power source of an electric vehicle, or the like in which a large storage capacity and high charge/discharge efficiencies are required.

In such an alkaline battery, nickel hydroxide ($Ni(OH)_2$) is employed as the active material of a positive electrode. The nickel hydroxide exhibits a high degree of positive-electrode activation in an alkaline aqueous solution because it rapidly generates reversible oxidation/reduction reactions therein as indicated below:

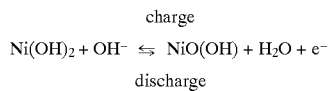

The nickel hydroxide is obtained in such a way that an aqueous solution of a nickelous salt such as nickel nitrate or nickel sulfate and the hydroxide of an alkali metal such as sodium are brought to a neutralizing reaction while the solution is being stirred (Official Gazette of Japanese Patent Application Laid-open No. 2-6340). Further, the electrochemical activity of the nickel hydroxide can be heightened by lowering the temperature and pH of the neutralizing reaction and the concentration of the reacting solution.

The aforementioned prior-art method of manufacture, however, has the problem that nitric acid ions exist as an impurity in the nickel hydroxide thus obtained, so the self-discharging of the battery increases due to shuttle reactions. The shuttle reactions will now be explained in conjunction with the following chemical formulae, by taking as an example a battery whose negative electrode contains a hydrogen-occlusion alloy as its active material:

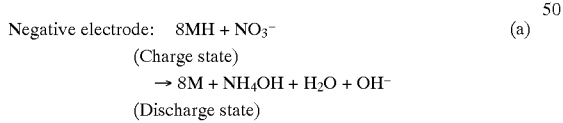

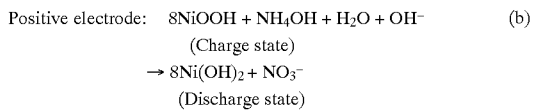

First, the nitric acid ions existing in the positive-electrode active material are eluted from the positive electrode into the electrolyte solution. Then, as indicated by chemical formula (a), the nitric acid ions ($NO_3^-$) reacts with the hydrogen-occlusion alloy (MH) contained in the negative-electrode active material, until a product $NH_4OH$ is formed.

As indicated by chemical formula (b), the formed product $NH_4OH$ subsequently reacts with a product $NiOOH$ formed in the positive-electrode active material during charging, thereby to form the nitric acid ions ($NO_3^-$). In this manner, insofar as the battery is in the charged state, the shuttle reactions take place, and the self-discharging proceeds.

With the intention of mitigating such self-discharging of the battery, therefore, a method has been proposed wherein nickel hydroxide formed from a nitrate is washed with water so as to eliminate the nitric acid ions ($NO_3^-$) (Official Gazette of Japanese Patent Application Laid-open No. 6-223826).

It has also been proposed to dissolve cobalt (Co) for a solid solution into a positive-electrode active material which contains nickel hydroxide (Official Gazette of Japanese Patent Application Laid-open No. 2-109261). Thus, the cobalt is facilitated to accept the high-temperature charge of the nickel hydroxide.

Herein, the solid solution should desirably be of high density in order to ensure a large capacity for the battery per unit volume or unit weight. As the solid solution, accordingly, the hydroxides of nickel (Ni) and cobalt (Co) are not formed from nitrates, but they are formed from the element nickel and the ammine complex $[Co(NH_3)_6]^{2+}$ (cobalt (II) ion) of the element cobalt.

More specifically, in preparing the solid solution, the solution of sodium hydroxide (an alkali metal hydroxide) is added into a mixed solution consisting of the element nickel and the ammine cobaltous complex. Thus, the solid solution is obtained as one consisting of the hydroxides ($Ni(OH)_2$, $Co(OH)_2$) of the elements nickel and cobalt.

With this method, however, the cobalt (II) ammine complex is oxidized by an oxidant (for example, oxygen) which is contained in a reaction system in the course of the formation of the ammine cobaltous complex, whereby a cobalt (III) ammine complex (an ammine cobaltic complex) is formed as an impurity. The cobalt (III) ammine complex remains without reacting with the alkali metal hydroxide, and it is included in the nickelous positive-electrode active material.

The cobalt (III) ammine complex induces an electrochemical reaction, and forms the product $NH_4OH$. This product causes the self-discharging of the battery due to the shuttle reaction indicated by the chemical formula (b). The remaining cobalt (III) ammine complex cannot be eliminated by the aforecited method disclosed in the Official Gazette of Japanese Patent Application Laid-open No. 6-223826.

SUMMARY OF THE INVENTION

In view of the problems of the prior art as stated above, the present invention has for its object to provide a method of manufacturing that nickelous positive-electrode active material for an alkaline battery which can suppress the self-discharging of the battery.

The manufacturing method of the present invention consists of a method of manufacturing a nickelous positive-electrode active material for an alkaline battery, having a formation process in which nickel hydroxide and cobalt hydroxide are formed by adding an alkali metal hydroxide into a reaction system containing nickel ions and cobalt (II) ions, comprising at least one step of removing any oxidant which oxidizes the cobalt (II) ions into cobalt (III) ions, from a reaction system of each process which proceeds during or before the formation process.

Alternatively, the manufacturing method of the present invention consists of a method of manufacturing a nickelous positive-electrode active material for an alkaline battery, having a formation process in which nickel hydroxide and cobalt hydroxide are formed by adding an alkali metal hydroxide into a reaction system containing nickel ions and cobalt (II) ions, comprising at least one step of removing cobalt (III) ions from a reaction system of each process which proceeds during or before the formation process.

According to the present invention, in this manner, the manufacturing method comprises the step of removing the oxidant which oxidizes the cobalt (III) ions or the step of removing the cobalt (III) ions themselves. It is therefore possible to suppress the shuttle reaction which is induced by the presence of the cobalt (III) ions. It is accordingly possible to provide the method of manufacturing the nickelous positive-electrode active material for the alkaline battery whose self-discharging can be suppressed.

DESCRIPTION OF THE PREFERRED EMBODIMENTS

In the present invention, a method of manufacturing a nickelous positive-electrode active material for an alkaline battery, having a formation process in which nickel hydroxide and cobalt hydroxide are formed by adding an alkali metal hydroxide into a reaction system containing nickel ions and cobalt (II) ions, comprises at least one step of removing any oxidant which oxidizes the cobalt (II) ions into cobalt (III) ions, from a reaction system of each process which proceeds during or before the formation process.

The most noteworthy feature of the present invention is to comprise the step of removing any oxidant from the reaction system of each process which proceeds during or before the formation process for forming the nickel hydroxide and the cobalt hydroxide.

Owing to the removal of the oxidant from the reaction system, the cobalt (II) ions can be prevented from oxidizing. It is therefore possible to suppress the formation of the cobalt (III) ions which are difficult to change into the cobalt hydroxide. Accordingly, the formation of the cobalt (III) ions can be mitigated, and the formation of the cobalt hydroxide is not hindered. In consequence, the cobalt hydroxide is smoothly formed from the cobalt (II) ions, and the nickelous positive-electrode active material of large capacity and high charging/discharging efficiencies can be obtained.

Besides, the cobalt (III) ions are not contained in the nickelous positive-electrode active material thus obtained. In the charging state, therefore, the shuttle reaction ascribable to the cobalt (III) ions as explained before does not occur. It is consequently possible to suppress the self-discharging of the battery.

As described above, according to the present invention, it is permitted to provide the method of manufacturing that nickelous positive-electrode active material for the alkaline battery which can suppress the self-discharging of the battery.

Next, an expedient for the removal of the oxidant should preferably be one in which the oxidant is reduced and removed by adding a reductant into the reaction system.

The oxidation potential of the reductant should preferably be lower than the reduction potential of oxygen (that is, the reductant should preferably be baser than oxygen). The expression "reduction potential of oxygen" is intended to mean a standard electrode potential at which the element oxygen is reduced, while the expression "oxidation potential of the reductant" is intended to mean a standard electrode potential at which the reductant is oxidized. Further, the word "baser" signifies that the potential of the material shifts to a minus potential side. Here, it signifies that the reductant lies at the potential capable of reducing the element oxygen.

Since, as stated above, the oxidation potential of the reductant is lower than the reduction potential of the element oxygen, oxygen contained in the atmospheric air etc. does not act as an oxidant on the cobalt (II) ions in the reaction system of each process, so that the formation of the cobalt (III) ions can be suppressed. Also, the formation of the cobalt (III) ions in the nickelous positive-electrode active material obtained can be prevented, so that the self-discharging of the battery can be suppressed.

Next, the reductant should preferably be L-ascorbic acid. Thus, the formation of the cobalt (III) ions can be efficiently suppressed.

In another aspect of performance, the reductant should preferably be a hydrogen sulfite compound, a sulfite compound or a boron hydride compound. In this case, the formation of the cobalt (III) ions can be suppressed similarly to the above.

It is possible to employ sodium hydrogen sulfite, for example, as the hydrogen sulfite compound, and sodium sulfite, for example, as the sulfite compound.

The reductant may well be added into the reaction system which contains the cobalt (II) ions. Alternatively, it may well be added into the reaction system which exists before the addition of the alkali metal hydroxide.

In still another aspect of performance, the reductant should preferably be lithium. Thus, the formation of the cobalt (III) ions can be efficiently suppressed.

Further, regarding the expedient for the removal of the oxidant, the above-mentioned one employing the reductant may well be replaced with one in which a non-oxidizing gas is introduced into the reaction system. The non-oxidizing gas is not especially restricted as long as it does not decrease the capacity of the battery by reacting with the nickelous positive-electrode active material. By way of example, an inert gas or a reducing gas is employed as such a non-oxidizing gas. It is also possible to employ any organic type gases, such as methane and ethane.

As the inert gas, any inorganic type gases, such as nitrogen ($N_2$), argon (Ar) and helium (He), is preferable from the viewpoint of safety.

In particular, the non-oxidizing gas should preferably be hydrogen gas. The reason therefor is that, since hydrogen has a reducing power, it can suppress the formation of the cobalt (III) ions more efficiently.

There is also an expedient in which the reaction system itself is changed into another reaction system containing no oxidant. Further, any other expedient may well be employed as long as the oxidant can be removed.

Next, the cobalt (II) ions can be obtained from an ammine cobaltous complex. In this case, a solid solution of high density can be prepared.

A preparation of the ammine cobaltous complex containing nickel and cobalt may be used as, for example, (1) an expedient in which ammonium sulfate or nitrate is added into and dissolved in a mixed aqueous solution consisting of an Ni (nickelous) salt and a Co (cobaltous) salt, or the likes, or (2) an expedient in which an Ni salt and a Co salt, or the likes are dissolved in aqua ammonia of low basicity. Usable as the Ni salt and the Co salt are, for example, the nitrates or sulfates of nickel and cobalt, respectively.

Meanwhile, the second method of the present invention is such that a method of manufacturing a nickelous positive-electrode active material for an alkaline battery, having a formation process in which nickel hydroxide and cobalt hydroxide are formed by adding an alkali metal hydroxide into a reaction system containing nickel ions and cobalt (II) ions, comprises at least one step of removing cobalt (III) ions from a reaction system of each process which proceeds during or before the formation process.

In the second method, the cobalt (III) ions which are sometimes existent in the reaction system are removed. Therefore, the formation of the cobalt hydroxide from the cobalt (II) ion is smoothly effected. It is accordingly possible to obtain a nickelous positive-electrode active material of large capacity and high charging/discharging efficiencies.

Besides, the cobalt (III) ions are not contained in the nickelous positive-electrode active material thus obtained. Therefore, the shuttle reaction ascribable to the cobalt (III) ions does not proceed in the charging state. It is consequently possible to suppress the self-discharging of the battery.

In the second method, an expedient for the removal of the cobalt (III) ions may be any of the same expedients as in the first method. Among them, especially preferable as the expedient for the removal of the cobalt (III) ions is one in which lithium is added to the reaction system or one in which hydrogen gas is added into the reaction system. The reason therefor is that, since the element hydrogen or lithium exhibits a high reducing power, the cobalt (III) ions are reduced into the cobalt (II) ions, so the cobalt (III) ions can be efficiently removed.

The expedient for the removal of the cobalt (III) ions is executed during or before the formation process. Herein, the execution during the formation process is favorable. The reason therefor is that, since the cobalt (III) ions are sometimes formed in the reaction system during the formation process, the cobalt hydroxide can be formed more smoothly by positively removing the cobalt (III) ions.

In the second method, the cobalt (II) ions should preferably be formed from an ammine cobaltous complex in the same manner as in the first method.

The method of manufacturing the nickelous positive-electrode active material for the alkaline battery will be described below in connection with examples of the aspect of performance of the present invention.

EXAMPLE 1 OF THE ASPECT OF PERFORMANCE

First, nickel nitrate and cobalt nitrate were added to water, thereby to prepare a mixed aqueous solution in which both the nitrates were dissolved. The cobalt nitrate was added so that cobalt contained therein becomes a concentration of 10 wt % in the mixed aqueous solution.

Next, as an expedient for removing any oxidant, a reductant was added to the mixed aqueous solution so as to be dissolved therein. Sodium hydronitrite, sodium sulfite or L-ascorbic acid was employed as the reductant. The reductant was added into the mixed aqueous solution to the amount of 10 ppm~10 wt %.

Subsequently, ammonium nitrate was added and dissolved to form a cobalt (II) ammine complex. Further, sodium hydroxide was added for a neutralizing reaction while the mixed aqueous solution was being stirred, whereby the mixed aqueous solution was adjusted to a pH value of 13. Thus, a solid solution consisting of cobalt hydroxide and nickel hydroxide was obtained. Finally, the solid solution was filtered, washed with water and dried, thereby to be turned into a powdery nickelous positive-electrode active material.

EXAMPLE 2 OF THE ASPECT OF PERFORMANCE

This example differed from Example 1 of the Aspect of Performance in that water subjected to an inert-gas substitution was employed as an expedient for removing any oxidant.

Nitrogen gas being an inert gas was bubbled in water, thereby to substitute the nitrogen gas for oxygen in the water.

After the nitrogen substitution, as in Example 1 of the Aspect of Performance, nickel nitrate and cobalt nitrate were added into the resulting water, thereby to prepare a mixed aqueous solution. Subsequently, ammonium sulfate and sodium hydroxide were added into the mixed aqueous solution in succession. Then, a solid solution consisting of cobalt hydroxide and nickel hydroxide was obtained. Finally, the solid solution was filtered, washed with water and dried, thereby to be turned into a powdery nickelous positive-electrode active material.

Comparative Example

This comparative example differed from Example 1 of the Aspect of Performance in that the step of removing any oxidant was not executed.

As in Example 1 of the Aspect of Performance, nickel nitrate and cobalt nitrate were dissolved in water not subjected to nitrogen bubbling, thereby to prepare a mixed aqueous solution consisting of both the nitrates. Subsequently, ammonium sulfate and sodium hydroxide were added into the mixed aqueous solution without adding any reductant. Then, a solid solution consisting of cobalt hydroxide and nickel hydroxide was obtained. Thereafter, the solid solution was filtered, washed with water and dried, thereby to be turned into a powdery nickelous positive-electrode active material.

Experimental Example

In this experimental example, the residual quantity of ammonia (an $NH_4$ content), a battery capacity holding rate and an initial positive-electrode activation velocity were measured for each of the nickelous positive-electrode active materials manufactured in Examples 1 and 2 of the Aspect of Performance, and the Comparative Example.

In the first place, the measurement of the $NH_4$ content was done in conformity with JIS (Japanese Industrial Standard) G1228 Distillation—Indophenol absorptiometry.

Concretely, the method of measuring the $NH_4$ content was as explained below.

First, each of the nickelous positive-electrode active materials was dissolved in hydrochloric acid to obtain a solution. Subsequently, the solution was rendered alkaline with sodium hydroxide. Thereafter, the alkaline solution was distilled with water vapor, and ammonia thus produced was absorbed by dilute sulfuric acid. Further, ammonium ions and phenol were reacted in the coexistence of sodium hypochlorite and pentacyanonitrosylferrate (III) sodium. The absorbency of a blue complex thus produced was measured.

Secondly, the capacity holding rate of each of batteries fabricated using the several nickelous positive-electrode active materials was measured as stated below.

First, 90 wt % of each of the powdery nickelous positive-electrode active materials and 10 wt % of cobalt (II) oxide were mixed, and the mixture was kneaded together with carboxymethyl cellulose and water into the state of a paste. The paste obtained was packed into foamed nickel (a collector material) having a porosity of 95%. After drying the paste, the resulting foamed nickel was molded into a positive-electrode plate.

Subsequently, the alkaline battery was fabricated by combining the positive-electrode plate, a separator of unwoven fabric made of polypropylene, an electrolyte solution mainly containing potassium hydroxide (KOH), and a negative-electrode plate of hydrogen-occlusion alloy.

The alkaline battery was fully charged, and was left to stand at 20° C. for 30 days. Thereafter, the remaining capacity of the battery was measured. Thus, the battery capacity holding rate of the nickelous positive-electrode active material was evaluated.

Here, the battery capacity holding rate in percentage was evaluated in conformity with the calculation formula of 100×(residual battery capacity)/(initial battery capacity).

Measured results obtained in the above ways are listed in Table 1.

As seen from the table, each of the nickelous positive-electrode active materials (Examples 1 and 2 of the Aspect of Performance) subjected to the step of removing the oxidant exhibited a small residual quantity of ammonia below 50 ppm and a high capacity holding rate of 75%.

On the other hand, in the case of employing no reductant (the Comparative Example), ammonia remained in a quantity which was larger than 10 times the quantity in each case of employing the reductant. Besides, the battery capacity holding rate of the Comparative Example was 10% lower than that of each of Examples 1 and 2 of the Aspect of Performance.

It is understood from the above results that the execution of the step of removing the oxidant realizes a small residual ammonia quantity in the nickelous positive-electrode active material and the suppression of the self-discharging of the battery.

The small residual ammonia quantity signifies that the quantity of reduction of the product NiOOH in the nickelous positive-electrode active material is small, so few shuttle reactions occur. It is accordingly understood that the nickelous positive-electrode active material in which very little of the ammonia which causes the shuttle reactions remains, also has little self-discharging.

TABLE 1

|  | Reductant | Nitrogen bubbling | $NH_4$ content | Capacity holding rate* |
|---|---|---|---|---|
| Example 1 of Aspect of performance | O | X | <50 ppm | 75% |
| Example 2 of Aspect of performance | X | O | <50 ppm | 75% |
| Comparative example | X | X | 500 ppm | 65% |

*Capacity holding percentage exhibited when each sample was left to stand at 20° C. for 30 days.

Lastly, the velocity of initial positive-electrode activation was measured as to each of the nickelous positive-electrode active materials of Examples 1 and 2 of the Aspect of Performance, and the Comparative Example. As a result, the initial activation velocity was about twice as high in each of the nickelous positive-electrode active materials of Examples 1 and 2 of the Aspect of Performance than in the Comparative Example, though this depended also upon the conditions of a conduction current, an ambient temperature, etc. This merit will be grounded on, for example, the effective utilization of the solid-solution cobalt.

As described above, according to the present invention, it is possible to provide a method of manufacturing that nickelous positive-electrode active material for an alkaline battery which can suppress the self-discharging of the battery. Further in accordance with the invention, it is possible to provide an alkaline battery manufactured by using a nickelous positive-electrode active material, the nickelous positive-electrode active material being manufactured by the method disclosed herein.

What is claimed is:

1. A method of manufacturing a nickelous positive-electrode active material for an alkaline battery, having a formation process in which nickel hydroxide and cobalt hydroxide are formed by adding an alkali metal hydroxide to a reaction system containing nickel ions and cobalt (II) ions, comprising:
at least one step of removing any oxidant which oxidizes the cobalt (II) ions into cobalt (III) ions, from a reaction system of each process which proceeds, at latest, during the formation process.

2. A method of manufacturing a nickelous positive-electrode active material for an alkaline battery as defined in claim 1, wherein an expedient for the removal of the oxidant is to reduce and remove said oxidant by adding a reductant to the reaction system.

3. A method of manufacturing a nickelous positive-electrode active material for an alkaline battery as defined in claim 2, wherein the reductant is L-ascorbic acid.

4. A method of manufacturing a nickelous positive-electrode active material for an alkaline battery as defined in claim 2, wherein the reductant is a compound selected from the group consisting of a hydrogen sulfite compound, a sulfite compound and a boron hydride compound.

5. A method of manufacturing a nickelous positive-electrode active material for an alkaline battery as defined in claim 2, wherein the reductant is lithium.

6. A method of manufacturing a nickelous positive-electrode active material for an alkaline battery as defined in claim 2, wherein an oxidation potential of the reductant is lower than a reduction potential of oxygen.

7. A method of manufacturing a nickelous positive-electrode active material for an alkaline battery as defined in claim 6, wherein said reductant is L-ascorbic acid.

8. A method of manufacturing a nickelous positive-electrode active material for an alkaline battery as defined in claim 6, wherein said reductant is a compound selected from the group consisting of a hydrogen sulfite compound, a sulfite compound and a boron hydride compound.

9. A method of manufacturing a nickelous positive-electrode active material for an alkaline battery as defined in claim 6, wherein said reductant is lithium.

10. A method of manufacturing a nickelous positive-electrode active material for an alkaline battery as defined in claim 1, wherein an expedient for the removal of the oxidant is to introduce a non-oxidizing gas into the reaction system.

11. A method of manufacturing a nickelous positive-electrode active material for an alkaline battery as defined in claim 10, wherein the non-oxidizing gas is hydrogen gas.

12. A method of manufacturing a nickelous positive-electrode active material for an alkaline battery as defined in claim 1, wherein the cobalt (II) ions are obtained from an ammine cobaltous complex.

13. A method of manufacturing a nickelous positive-electrode active material for an alkaline battery, having a formation process in which nickel hydroxide and cobalt hydroxide are formed by adding an alkali metal hydroxide to a reaction system containing nickel ions and cobalt (II) ions, comprising:

at least one step of removing cobalt (III) ions from a reaction system of each process which proceeds, at latest, during the formation process.

14. A method of manufacturing a nickelous positive-electrode active material for an alkaline battery as defined in claim 13, wherein an expedient for the removal of the cobalt (III) ions is to add lithium to the reaction system.

15. A method of manufacturing a nickelous positive-electrode active material for an alkaline battery as defined in claim 13, wherein an expedient for the removal of the cobalt (III) ions is to add hydrogen gas to the reaction system.

16. A method of manufacturing a nickelous positive-electrode active material for an alkaline battery as defined in claim 13, wherein the cobalt (II) ions are obtained from an ammine cobaltous complex.

17. An alkaline battery manufactured by using a nickelous positive-electrode active material, the positive-electrode active material being manufactured by a method having a formation process in which nickel hydroxide and cobalt hydroxide are formed by adding an alkali metal hydroxide to a reaction system containing nickel ions and cobalt (II) ions, and the method comprising:

at least one step of removing any oxidant which oxidizes the cobalt (II) ions into cobalt (III) ions, from a reaction system of each process which proceeds, at latest, during the formation process.

18. An alkaline battery manufactured by using a nickelous positive-electrode active material, the positive-electrode active material being manufactured by a method having a formation process in which nickel hydroxide and cobalt hydroxide are formed by adding an alkali metal hydroxide to a reaction system containing nickel ions and cobalt (II) ions, and the method comprising:

at least one step of removing cobalt (III) ions from a reaction system of each process which proceeds, at latest, during the formation process.

* * * * *